United States Patent
Farina

[11] Patent Number: 5,467,805
[45] Date of Patent: Nov. 21, 1995

[54] LEAD GRID SPREADING MACHINE FOR MAKING GRID PLATES FOR ELECTRIC ACCUMULATORS

[75] Inventor: Pietro Farina, Villafrance, Italy

[73] Assignee: Sovema S.r.l., Villafeanca, Italy

[21] Appl. No.: 282,008

[22] Filed: Jul. 29, 1994

[30] Foreign Application Priority Data

May 27, 1994 [IT] Italy ................... VR94A000

[51] Int. Cl.$^6$ .................................................. H01M 4/72
[52] U.S. Cl. ................. 141/32; 141/1.1; 141/280
[58] Field of Search .................. 141/1.1, 32, 280; 29/2

[56] References Cited

U.S. PATENT DOCUMENTS

| | | | |
|---|---|---|---|
| 3,814,628 | 6/1974 | Larkin | 117/201 |
| 4,050,482 | 9/1977 | Ching et al. | 141/1.1 |
| 4,878,522 | 11/1989 | Ostrander | 141/32 |
| 4,932,443 | 6/1990 | Karolek et al. | 141/32 |

Primary Examiner—Henry J. Recla
Assistant Examiner—Timothy L. Maust
Attorney, Agent, or Firm—Browdy and Neimark

[57] ABSTRACT

A spreading machine has a first conveyor belt, with a high friction rest surface for carrying a grid to be covered with paste; a paste spreading chamber towards which the first conveyor belt advances, where paste is spread on an upper and a lower face of the grid; apparatus for spreading paste on the grid at the spreading chamber; a paste loading hopper which feeds the spreading chamber; a second conveyor belt moving away from the spreading chamber, having an uncompressible rest surface; a calibrator for regulating breadth of paste spread on one face of the grid; a paste recycling chamber communicating with the spreading chamber and the loading hopper to remove excess paste from the spreading chamber; and a paste pressure regulator inside the spreading chamber.

5 Claims, 2 Drawing Sheets

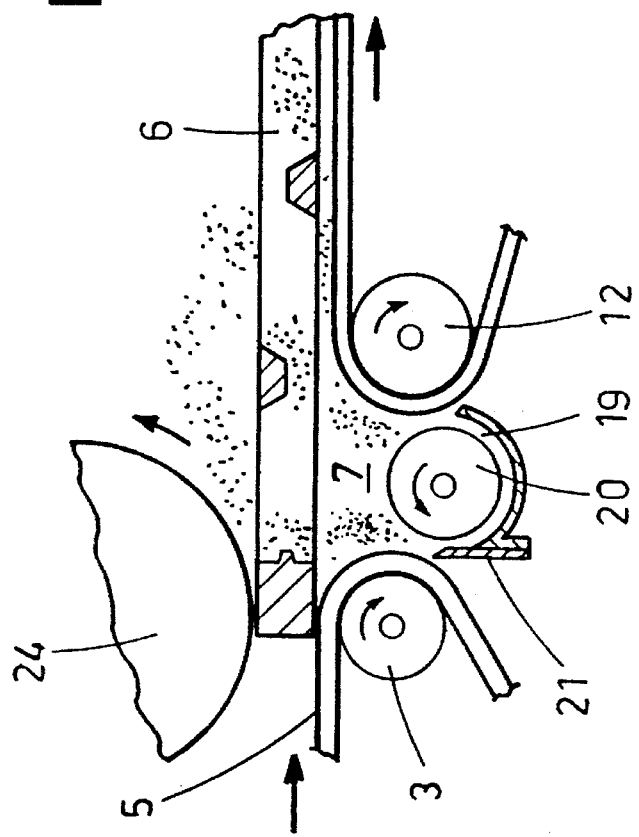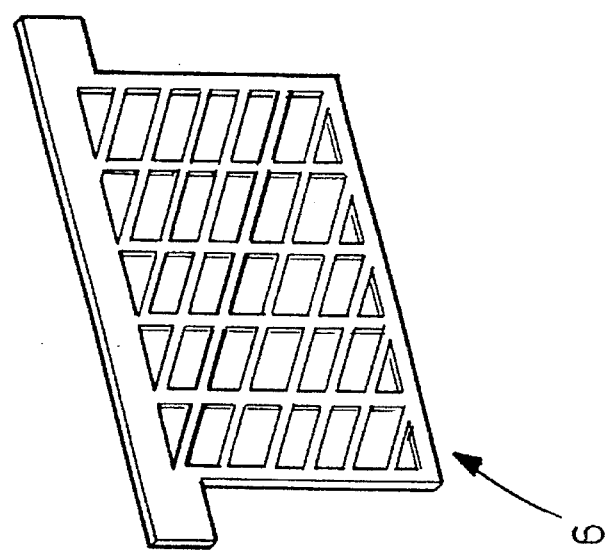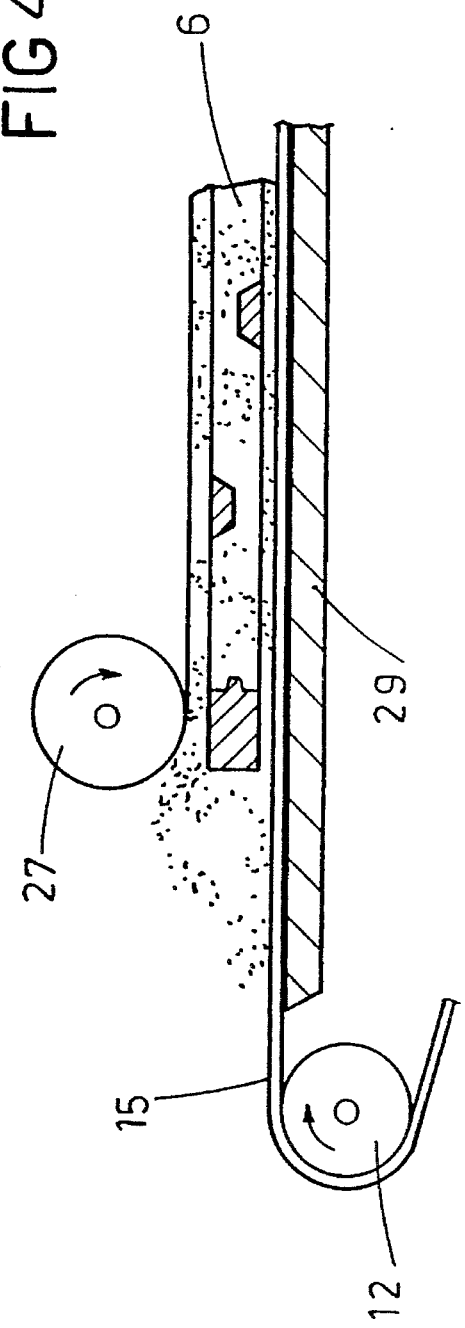

LEAD GRID SPREADING MACHINE FOR MAKING GRID PLATES FOR ELECTRIC ACCUMULATORS

FIELD OF THE INVENTION

The present invention relates to battery paste spreading devices.

BACKGROUND OF THE INVENTION

The electric accumulator industry, which manufactures batteries for automobiles or other, stationary purposes, employs special machines for spreading lead oxide paste on lead alloy grids, which are thereafter usually known as plates.

The prior art teaches two basic processes for obtaining plates, which can be summarized as follows:

a) A first system is where the grids are transported on a conveyor belt below a hopper having spreading rollers.

The conveyor belt draws the grids across the rollers. To overcome the resistance produced by the lead oxide paste, the belt has to be soft and must exhibit a corrugated surface. Consequently and disadvantageously, it is difficult for the paste to reach the bottom surface of the grid on the conveyor belt since that surface is partially sunk in the soft surface of the belt, so that said bottom surface is at best only partially covered.

If a rigid belt is used instead, the above drawback is obviated, but the grids tend to slip and slide on the belt surface as they pass under the hopper rollers.

b) A second system provides two counter-rotating drawing rollers which push the grids under the hopper. After lead oxide application, the grids pass through a tunnel comprising one plate superposed on and parallel to another plate, which tunnel finishes the grid by skimming off any superfluous paste and leaving a correct thickness of paste on the grid.

Due to the considerable friction forces created in the tunnel area, a following grid is used to push a leading grid through. This leads to frequent blockage in the tunnel, which by necessity has to afford only a small passage space. Add to this the low mechanical resistance of the grid plates, which are only from 1.2mm to 1.6mm thick, and bearing in mind that they are in fact grids and not strong, and it will be easy to imagine how they deform and suffer from such treatment.

Furthermore, even leaving aside the above drawback, the final thickness of the lead oxide paste covering is not optimally controllable.

BRIEF SUMMARY OF THE INVENTION

The principal aim of the present invention is to obviate the above-mentioned drawbacks by providing a spreading machine wherein both faces of the grids can be covered with lead-oxide-based paste, while an optimal covering thickness is simulaneously obtained.

A further aim is to provide a spreading machine able to cover grids to obtain high-quality plates satisfying the following requisites: low nonreactive material weight (meaning the lead alloy of the grid) in relation to the total grid surface, so that the thinnest possible grids with wide grid nets can be used and thus more paste can be spread on each grid; uniform compacting of the paste; high mechanical resistance of the paste which for this reason has to be compacted on the grid such that it does not subsequently flake off; covering and pressing over both grid faces so that electrical resistance is low.

These and further aims besides are all attained by the spreading machine of the invention, the principal characteristics of which will emerge from the claims following the present description.

BRIEF DESCRIPTION OF THE DRAWINGS

Further characteristics and advantages of the present invention will better emerge from the detailed description that follows, of a preferred but non-exclusive embodiment here illustrated in the form of a non-limiting example in the accompanying drawings, in which:

FIG. 1 shows a grid formed in a lead alloy net;

FIG. 3 is an enlarged detail taken from FIG. 2, showing the grid spreading chamber;

FIG. 4 is a further enlarged detail taken from FIG. 2, showing the finishing zone of the grid spreading operation.

DESCRIPTION OF THE PREFERRED EMBODIMENT

Figure 2:
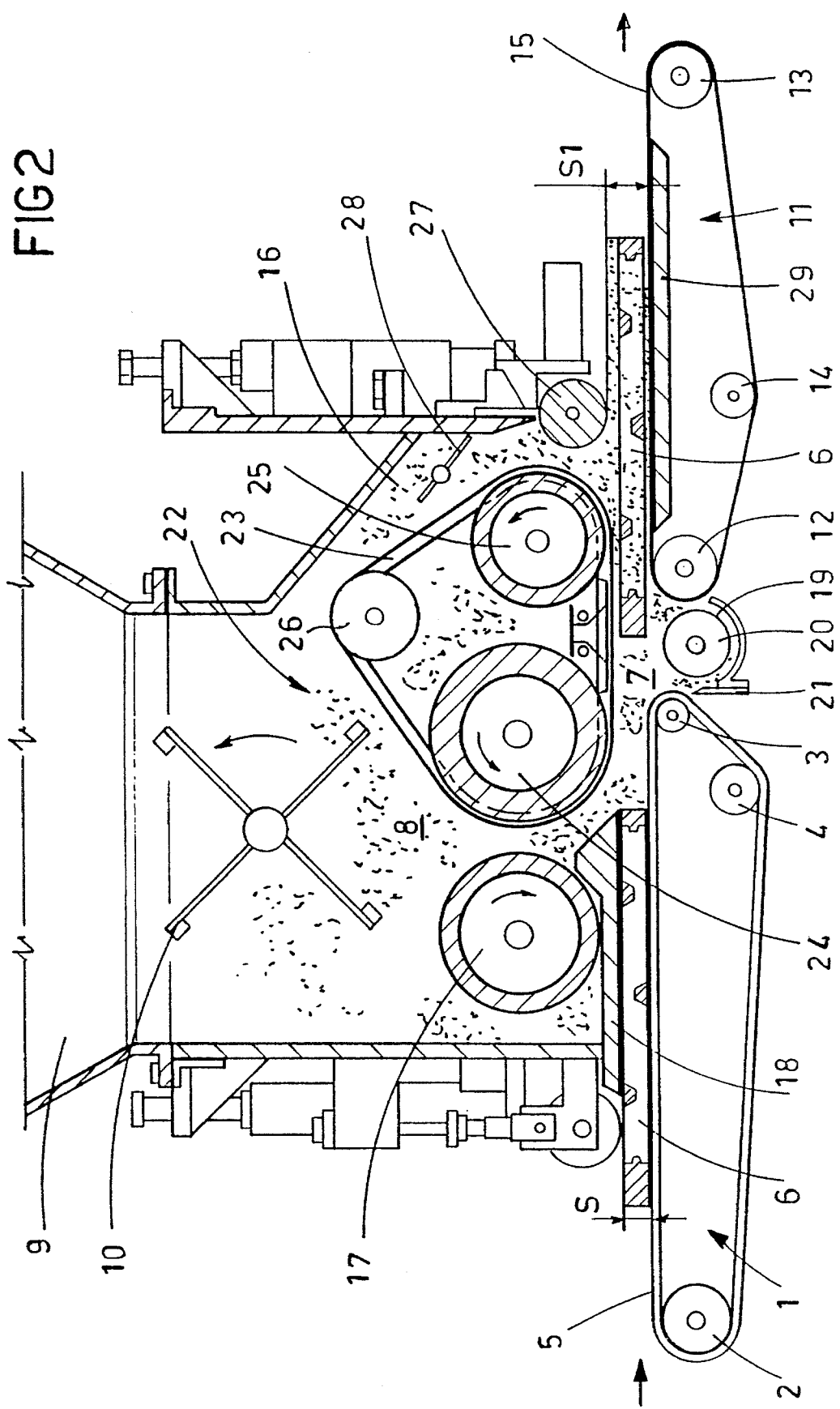
FIG. 2 is a schematic view of the machine in a section made in a median vertical plane.

With reference to the drawings, the spreading machine of the invention comprises the following components.

A first conveyor belt 1, ring-wound about two rollers 2 and 3 and a tension roller 4, carries a lead-alloy grid 6 (illustrated in FIG. 1). The rest surface 5 of the belt 1 is soft and has a high friction coefficient such as to guarantee good transport of the grid 6 throughout every operative procedure.

The first belt 1 advances (see FIG. 2) towards a spreading chamber 7 where the upper and lower faces of the grid 6 are spread with lead-oxide-based paste 8 using special means for spreading which will be more fully explained hereinbelow.

A paste 8 loading hopper 9 internally equipped with an agitator 10 communicates interiorly with the spreading chamber 7, thus feeding it with paste.

Downstream of the spreading chamber 7 is a second conveyor belt 11, ringwound on two rollers 12 and 13 and having a tension roller 14, on which rest surface 15 the grill 6 is positioned after having passed through the spreading chamber 7. The rest surface 15 is uncompressible such that the grid 5 cannot sink partially into it. The second belt 11 advances away from the spreading chamber 7 (direction shown by an arrow in FIG. 2) and is associated to a calibrator, which will be better described hereinunder, regulating the paste 8 thickness on the grids 6.

A recycling chamber 16 for excess paste 8 places the spreading chamber 7 in communication with the hopper 9. A regulator is positioned in the recycling chamber 16 to regulate paste 8 pressure inside the spreading chamber 7.

The above-mentioned means for spreading comprise the following.

A rotating conveyor roller 17 positioned inside the hopper 9 pushes the paste 8 on to the upper face of the grid 6 transiting through the spreading chamber 7. More precisely, the conveyor roller 17 is set above a horizontal wall 18 which is part of the hopper 9 bottom. Said horizontal wall 18 is positioned partially above the first belt 1, as can be seen in FIG. 2, and is distanced from the first belt 1 by a height which is slightly above that of a thickness S of a grid 6, so that the grid 6 can just pass beneath the horizontal wall 18.

A rotating counter-roller 20 is positioned in a housing cavity 19 in a lower part of the spreading chamber 7, which counter-roller 20 compresses the paste 8 on to the lower face of the grid 6 when the latter transits on it in the spreading chamber 7. A scraping blade 21 is mounted by a side of the housing cavity 19 such that it breasts the surface of the first belt 1 and cleans the belt 1 surface, nudging the superfluous paste 8 into the housing cavity 19.

The means for spreading further comprise a spreading and transport group 22 comprising a belt 23 ring-wound about two rotating rollers 24 and 25 and a tension roller 26. The belt 23 is positioned above the grid 6 transiting in the spreading chamber 7, and thus compresses the paste 8 on the upper face of the grid 6, while advancing it from the first belt 1 to the second belt 11.

The minimum distance between the belt 23 and the second belt 11 surface is equal to the thickness S of the grid 6 plus the two paste 8 layers on the upper and lower grid 6 faces.

The above-mentioned calibrator comprises a finishing roller 27 arranged above the second belt 11 at a minimum distance from it corresponding to the optimal breadth of the paste 8 layer applicable on the upper grid 6 face as it emerges, covered above and below, from the spreading chamber 7.

The optimal breadth of the finished gridplate (that is, the grid plus the two paste 8 layers) is denoted in FIG. 2 by S1.

To facilitate grid 6 transit, the first belt 1 and the second belt 11 are arranged in line with one another and at a reciprocal distance such that the grid 6 passes from the first to the second belts while always resting on at least one of them. The rest surface 15 of the second belt 11 is positioned at a lower height than the rest surface 5 of the first belt 1 (see FIG. 2). The difference in height corresponds to the breadth of the paste 8 spread on the lower face of the grid 6 of the spreading chamber 7.

The above-mentioned regulator comprises in the example of FIG. 2, a butterfly valve 28 positioned in the recycling chamber 16. By acting on the butterfly valve 28 a change in degree of hardness and compression is obtained on the paste 8 upstream of the butterfly valve 28 (and thus especially in the spreading chamber 7) since by varying the aperture the resistance provided by the paste 8 in the recycling flow in the recycling chamber 16 is changed.

Finally, the second belt 11 runs on a rigid fixed plane in order that the rest surface 15 can be made uncompressible.

What is claimed:

1. A machine for spreading a paste on lead grids to manufacture plates for electrical accumulators, comprising:

a first conveyor belt, having a rest surface with a high friction coefficient for carrying a grid to be covered with the paste;

a spreading chamber of the paste, downstream of the first conveyor belt and towards which the first conveyor belt advances, at which paste is spread on an upper and a lower face of the grid; means for spreading the paste on the grid being provided at the spreading chamber;

a loading hopper of the paste which is in communication with and which feeds the spreading chamber;

a second conveyor belt moving in a direction away from the spreading chamber, having an uncompressible rest surface, for distancing the grid from the spreading chamber;

a calibrator, positioned at the second conveyor belt, for regulating a breadth of paste spread on at least one face of the grid;

a recycling chamber of the paste, communicating with the spreading chamber and the loading hopper, whereat excess quantities of the paste are removed from the spreading chamber and returned to the loading hopper; and a regulator, positioned in the recycling chamber, for setting a pressure of the paste inside the spreading chamber;

wherein the means for spreading comprise:

a rotating conveyor roller placed inside the loading hopper and positioned above a wall partially overlying the first conveyor belt and distanced from the first conveyor belt by a superior distance to a thickness of the grid; said conveyor roller spreading the paste on the upper face of the grid transiting in the spreading chamber;

a rotating counter-roller positioned in a housing cavity fashioned in the spreading chamber below the lower face of the grid transiting through the spreading chamber, which counter-roller compresses the paste on said lower face of the grid;

a scraping blade which breasts a conveyor plane of the first conveyor belt and constitutes a lateral side of the housing cavity; and a spreading and transport group, comprising a belt ring-wound about two rollers and a tension roller, and positioned above a grid transiting in the spreading chamber, which spreading and transport group compresses the paste on the upper face of the grid and contemporaneously nudges the grid from the first conveyor belt to the second conveyor belt.

2. A machine as in claim 1, wherein a minimum distance between the belt of the spreading and transport group and the second conveyor belt is equal to a breadth of the grid increased by two layers of the paste, one of the two layers being on the upper face of the grid and another of the two layers being on the lower face of the grid.

3. A machine for spreading a paste on lead grids to manufacture plates for electrical accumulators, comprising:

a first conveyor belt, having a rest surface with a high friction coefficient for carrying a grid to be covered with the paste;

a spreading chamber of the paste, downstream of the first conveyor belt and towards which the first conveyor belt advances, at which paste is spread on an upper and a lower face of the grid; means for spreading the paste on the grid being provided at the spreading chamber;

a loading hopper of the paste which is in communication with and which feeds the spreading chamber;

a second conveyor belt moving in a direction away from the spreading chamber, having an uncompressible rest surface, for distancing the grid from the spreading chamber;

a calibrator, positioned at the second conveyor belt, for regulating a breadth of paste spread on at least one face of the grid;

a recycling chamber of the paste, communicating with the spreading chamber and the loading hopper, whereat excess quantities of the paste are removed from the spreading chamber and returned to the loading hopper; and a regulator, positioned in the recycling chamber, for setting a pressure of the paste inside the spreading chamber; wherein the first conveyor belt is aligned to the second conveyor belt and is at a distance from the second conveyor belt such that when the grid passes from the first conveyor belt to the second conveyor belt, the grid rests always on at least one thereof;

the rest plane of the second conveyor belt being placed at a lower level than the rest plane of the first conveyor belt;

a distance in height between said first conveyor belt and said second conveyor belt being equal to a breadth of a layer the paste spread on a face of the grid.

4. A machine for spreading a paste on lead grids to manufacture plates for electrical accumulators, comprising:

a first conveyor belt, having a rest surface with a high friction coefficient for carrying a grid to be covered with the paste;

a spreading chamber of the paste, downstream of the first conveyor belt and towards which the first conveyor belt advances, at which paste is spread on an upper and a lower face of the grid; means for spreading the paste on the grid being provided at the spreading chamber;

a loading hopper of the paste which is in communication with and which feeds the spreading chamber;

a second conveyor belt moving in a direction away from the spreading chamber, having an uncompressible rest surface, for distancing the grid from the spreading chamber;

a calibrator, positioned at the second conveyor belt, for regulating a breadth of paste spread on at least one face of the grid;

a recycling chamber of the paste, communicating with the spreading chamber and the loading hopper, whereat excess quantities of the paste are removed from the spreading chamber and returned to the loading hopper; and a regulator, positioned in the recycling chamber, for setting a pressure of the paste inside the spreading chamber; wherein the regulator is a butterfly valve positioned inside the recycling chamber.

5. A machine for spreading a paste on lead grids to manufacture plates for electrical accumulators, comprising:

a first conveyor belt, having a rest surface with a high friction coefficient for carrying a grid to be covered with the paste;

a spreading chamber of the paste, downstream of the first conveyor belt and towards which the first conveyor belt advances, at which paste is spread on an upper and a lower face of the grid; means for spreading the paste on the grid being provided at the spreading chamber;

a loading hopper of the paste which is in communication with and which feeds the spreading chamber;

a second conveyor belt moving in a direction away from the spreading chamber, having an uncompressible rest surface, for distancing the grid from the spreading chamber;

a calibrator, positioned at the second conveyor belt, for regulating a breadth of paste spread on at least one face of the grid;

a recycling chamber of the paste, communicating with the spreading chamber and the loading hopper, whereat excess quantities of the paste are removed from the spreading chamber and returned to the loading hopper; and a regulator, positioned in the recycling chamber, for setting a pressure of the paste inside the spreading chamber; wherein a fixed rigid plane is situated immediately below the rest surface of the second conveyor belt such as to render said rest surface uncompressible.

\* \* \* \* \*